US009563997B2

(12) United States Patent
Hsueh et al.

(10) Patent No.: US 9,563,997 B2
(45) Date of Patent: Feb. 7, 2017

(54) SMART KEY AND METHOD THEROF FOR GENERATING MATCHING KEY OF LOCK

(71) Applicant: HON HAI PRECISION INDUSTRY CO., LTD., New Taipei (TW)

(72) Inventors: Kao-Chao Hsueh, New Taipei (TW); Wen-Chia Lee, New Taipei (TW); An-Chi Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 71 days.

(21) Appl. No.: 14/600,823

(22) Filed: Jan. 20, 2015

(65) Prior Publication Data

US 2016/0140787 A1 May 19, 2016

(30) Foreign Application Priority Data

Nov. 19, 2014 (TW) ............................ 103140139 A

(51) Int. Cl.
*G05B 19/00* (2006.01)
*G07C 9/00* (2006.01)

(52) U.S. Cl.
CPC . *G07C 9/00563* (2013.01); *G07C 2009/00095* (2013.01)

(58) Field of Classification Search
None
See application file for complete search history.

(56) References Cited

U.S. PATENT DOCUMENTS

2002/0140542 A1* 10/2002 Prokoski et al. .. G06K 9/00885 340/5.52

FOREIGN PATENT DOCUMENTS

TW 200909653 A 3/2009
TW M375107 U 3/2010

* cited by examiner

*Primary Examiner* — Ojiako Nwugo
(74) *Attorney, Agent, or Firm* — Zhigang Ma

(57) ABSTRACT

A method for generating a matching key of a lock includes obtaining user information input by a user of a smart key, determining whether the user is an authorized user of the smart key, obtaining lock information of the lock, obtaining key information of the lock, and generating a matching key to unlock the lock. When the lock is an electronic lock, the smart key generates an electronic matching key. When the lock is a mechanical lock, the smart key generates a mechanical matching key.

20 Claims, 3 Drawing Sheets

SMART KEY AND METHOD THEROF FOR GENERATING MATCHING KEY OF LOCK

FIELD

The subject matter herein generally relates to locks and keys, and more particularly to a smart key for unlocking a plurality of electronic and mechanical locks.

BACKGROUND

Generally, each lock requires a designated key to be opened. An electronic lock may require an electronic key, and a mechanical lock may require a mechanical key.

BRIEF DESCRIPTION OF THE DRAWINGS

Implementations of the present technology will now be described, by way of example only, with reference to the attached figures.

DETAILED DESCRIPTION

Figure 1:
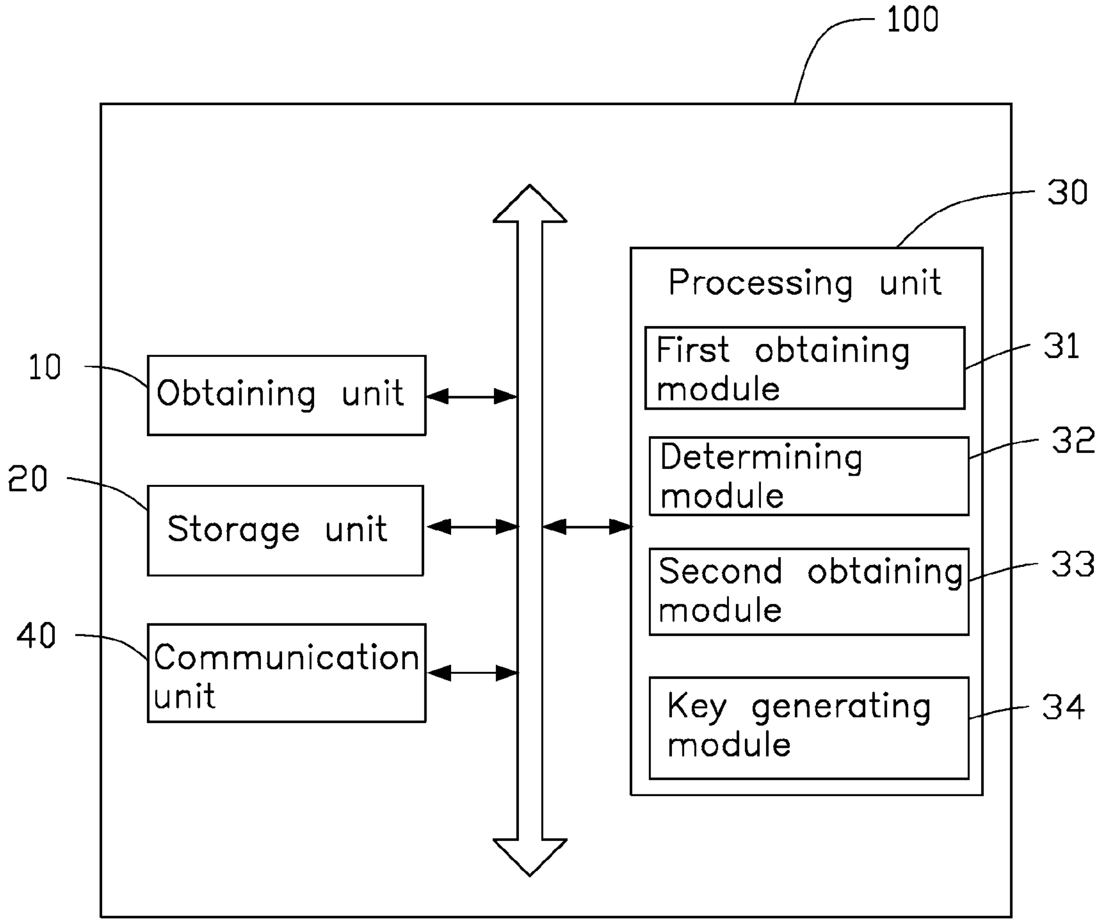
FIG. 1 is a block diagram of an embodiment of a smart key.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an embodiment of a smart key 100 for unlocking a lock (not shown). The smart key 100 can include an obtaining unit 10, a storage unit 20, a processing unit 30, and a communication unit 40. The obtaining unit 10 can include at least one input terminal (not shown) for obtaining user information and lock information. The storage unit 20 can store predetermined user information and predetermined lock information. The storage unit 20 can be built into the smart key 100, or be an external device coupled to the smart key 100. In the illustrated embodiment, the storage unit 20 is built into the smart key 100. The communication unit 40 can establish wireless or wired communication with the lock. The wireless communication can include BLUETOOTH®, NFC®, and infrared, for example.

The processing unit 30 can include a plurality of modules for unlocking the locks. The plurality of modules can include a first obtaining module 31, a determining module 32, a second obtaining module 33, and a key generating module 34. The modules 31-34 can include one or more software programs in the form of computerized codes stored in the storage unit 20. The computerized codes include instructions executed by the processing unit 30 to provide functions for the modules 31-34.

The first obtaining module 31 can obtain the user information and the lock information from the obtaining unit 10.

The determining module 32 can determine whether the user information matches the predetermined user information. If the user information matches the predetermined user information, then the user is an authorized user of the smart key 100. If the user information does not match the predetermined user information, then the user is not an authorized user of the smart key 100. The user information can be a fingerprint of the user, a picture of a face of the user, or a username and password of the user, for example. When the user information is a fingerprint, then the input terminal of the obtaining module 31 can be a fingerprint scanner. When the user information is a picture of the face of the user, then the input terminal can be a camera. When the user information is a username and password, then the input terminal can be a keypad.

The second obtaining module 33 can obtain the predetermined lock information from the storage unit 20 according to the lock information. The lock information can be a picture of the lock, a geographic location of the lock, or a preset serial code of the lock, for example. When the lock information is a picture of the lock, then the input terminal can be a camera. When the lock information is a geographic location of the lock, then the input terminal can be a global positioning system. When the lock information is a preset serial code, the input terminal can be a keypad. The second obtaining module 33 can further obtain corresponding key information from the predetermined lock information.

The key generating module 34 can generate a matching key according to the key information. When the lock is an electronic lock, then the key generating module 34 can generate an electronic matching key according to the key information. When the lock is a mechanical lock, then the key generating module 34 can generate a mechanical matching key according to the key information. The electronic matching key can be an unlock instruction transmitted to the lock through the communication unit 40. Thus, the smart key 100 can be used to unlock a plurality of different electronic locks.

Figure 2:
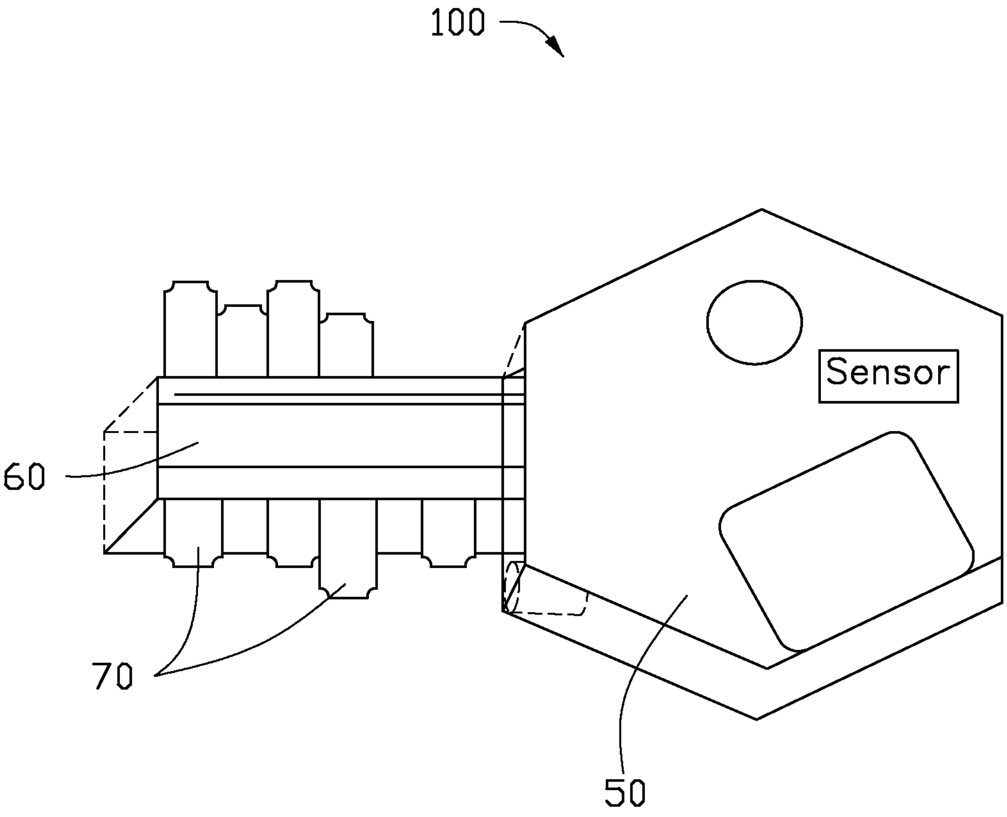
FIG. 2 is a diagrammatic view of the smart key of FIG. 1.

Referring to FIG. 2, the smart key 100 can include a key body 50, a key shaft 60 extending from the key body 50, and a plurality of key teeth 70 extending from the key shaft 60. The key shaft 60 can be extendable and retractable relative to the key body 50. The key teeth 70 can be extendable and retractable relative to the key shaft 60. The key generating module 34 can generate the mechanical key by controlling the key shaft 60 and the plurality of key teeth 70 to extend or retract to predetermined lengths according to the key information. Thus, the smart key 100 can be used to unlock a plurality of different mechanical locks.

Figure 3:
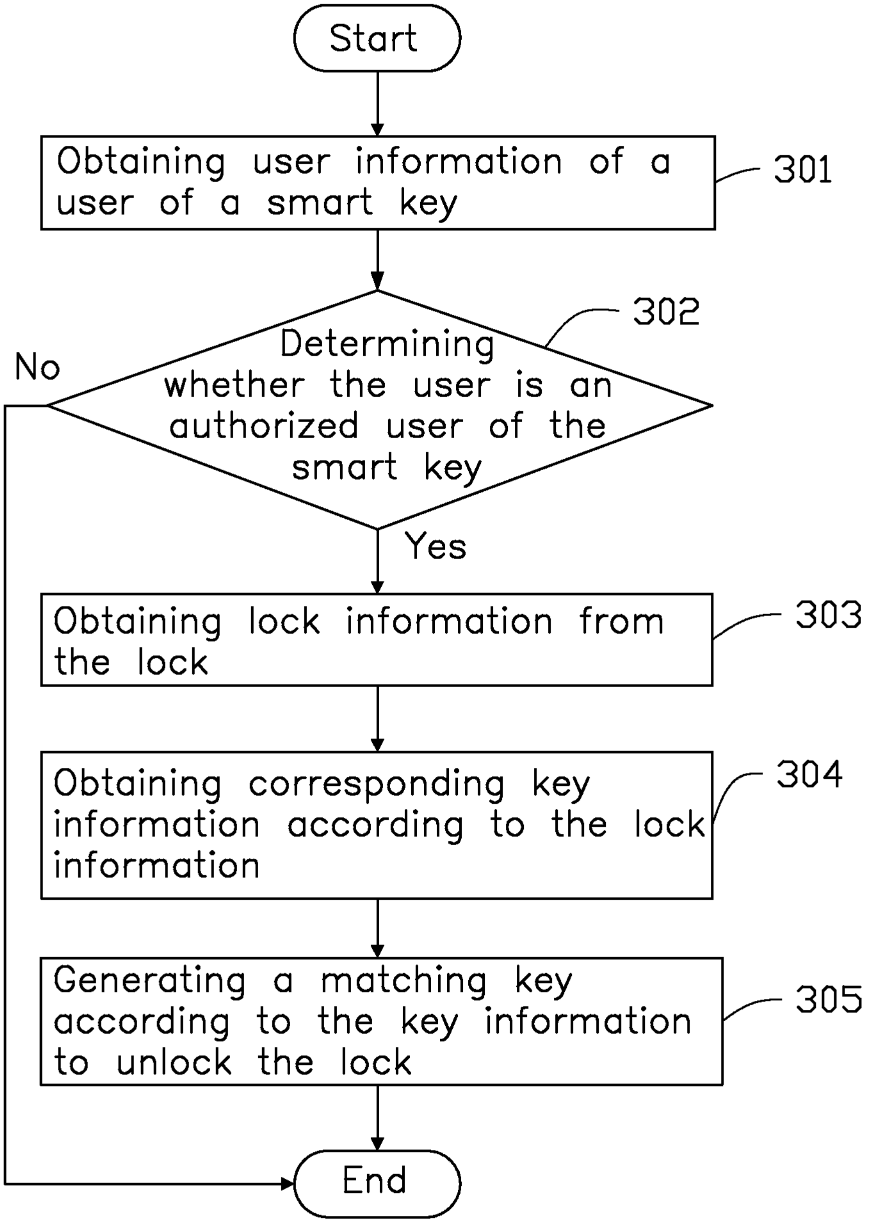
FIG. 3 is a flowchart of a method for generating a matching key of a lock.

FIG. 3 illustrates a flowchart of an exemplary method for generating a matching key of a lock. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only, and the order of the blocks can be changed. Additional blocks may be added or fewer blocks may be utilized, without departing from this disclosure. The example method can begin at block 301.

At block 301, user information of a user of a smart key can be obtained from an input terminal of the smart key. The user information can include a fingerprint of the user, a picture of a face of the user, or a username and password of the user, for example. When the user information is a fingerprint, then the input terminal can be a fingerprint scanner. When the user information is a picture of the face of the user, then the input terminal can be a camera. When the user information is a username and password, then the input terminal can be a keypad.

At block 302, the smart key can determine whether the user is an authorized user of the smart key by comparing the user information to predetermined user information stored in the smart key. When the user information matches the predetermined user information, block 303 is implemented. When the user information does not match the user information, the method ends.

At block 303, the smart key can obtain lock information from the lock. The lock information can be a picture of the lock, a geographic location of the lock, or a preset serial code of the lock, for example. When the lock information is a picture of the lock, then the input terminal can be a camera. When the lock information is a geographic location of the lock, then the input terminal can be a global positioning system. When the lock information is a preset serial code, then the input terminal can be a keypad.

At block 304, the smart key can obtain corresponding key information according to the lock information. In detail, the lock information is matched to predetermined lock information stored in the smart key, and the corresponding key information is obtained from the predetermined lock information.

At block 305, the smart key can generate a matching key according to the key information to unlock the lock. When the lock is an electronic lock, the smart key can generate an electronic matching key. The electronic matching key can be an unlock instruction transmitted to the electronic lock through BLUETOOTH®, NFC®, or infrared, for example. When the lock is a mechanical lock, the smart key can generate a mechanical matching key by extending or retracting a key shaft and a plurality of key teeth of the smart key to predetermined lengths according to the key information.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for generating a matching key of a lock, the method comprising:

obtaining user information input from a user of a smart key, wherein the smart key comprises a key body, a key shaft is extendable and retractable relative to the key body, and a plurality of key teeth are extendable and retractable relative to the key shaft;

determining whether the user is an authorized user of the smart key;

obtaining lock information of the lock;

obtaining key information of the lock; and generating a matching key to unlock the lock.

2. The method as in claim 1, wherein:

the smart key and the lock communicate with each other through a wireless or wired method; and the wireless method comprises BLUETOOTH®, NFC®, and infrared.

3. The method as in claim 1, wherein:

the user information is compared to predetermined user information stored in the smart key to determine whether the user is an authorized user of the key; and the key information is obtained by matching the lock information to predetermined lock information stored in the smart key.

4. The method as in claim 3, wherein:

the lock information is obtained after determining that the user is an authorized user of the smart key;

the key information is determined according to the predetermined lock information; and the matching key is produced according to the key information.

5. The method as in claim 1, wherein:

the user information is input to the smart key;

the smart key determines whether the user is an authorized user;

the smart key obtains the lock information of the lock;

the smart key determines the key information; and the matching key is produced by the smart key.

6. The method as in claim 1, wherein the smart key is operable by a plurality of authorized users.

7. The method as in claim 1, wherein a type of the lock comprises an electronic lock and a mechanical lock.

8. The method as in claim 7, wherein:

when the lock is an electronic lock, the smart key produces an electronic matching key to unlock the electronic lock; and when the lock is a mechanical lock, the smart key produces a mechanical matching key to unlock the mechanical lock.

9. A smart key comprising:

a key body;

a key shaft extendable and retractable relative to the key body;

a plurality of key teeth extendable and retractable relative to the key shaft;

a communication unit configured to establish wireless or wired communication with a lock;

an obtaining unit configured to obtain user information from a user of the smart key, and obtain lock information from the lock;

a storage unit configured to store predetermined user information of an authorized user, store predetermined lock information of the lock, and store a plurality of instructions of a plurality of modules; and a processing unit configured to execute the plurality of instructions of the plurality of modules, the plurality of modules comprising:

a first obtaining module configured to obtain the user information and the lock information from the obtaining unit;

a determining module configured to determine whether the user information matches the predetermined user information;

a second obtaining module configured to obtain the predetermined lock information from the storage unit, and obtain corresponding key information from the predetermined lock information; and a key generating module configured to generate a matching key for unlocking the lock according to the key information; wherein:

the obtaining unit, the storage unit, the communication unit, and the processing unit belong to the unlocking system of the smart key.

10. The smart key as in claim 9, wherein a type of the lock comprises an electronic lock and a mechanical lock.

11. The smart key as in claim 10, wherein:

when the lock is an electronic lock, the lock producing module produces an electronic matching key; and when the lock is a mechanical lock, the lock producing module produces a mechanical matching key.

12. The smart key as in claim 11, wherein:

the electronic matching key is formed by generating an unlock instruction according to the key information, and the electronic key is transmitted to the lock through the communication unit; and the mechanical matching key is formed by extending or retracting the key shaft and the plurality of key teeth to predetermined lengths according to the key information.

13. The smart key as in claim 9, wherein the obtaining unit comprises at least one input terminal for obtaining the user information and the lock information.

14. The smart key as in claim 13, wherein the user information comprises a fingerprint of the user, a picture of the user's face, and a username and password of the user.

15. The smart key as in claim 14, wherein:

when the user information is a fingerprint, the input terminal is a fingerprint scanner;

when the user information is a picture of the user's face, the input terminal is a camera; and when the user information is a username and password, the input terminal is a keypad.

16. The smart key as in claim 13, wherein the lock information comprises a picture of the lock, a geographic location of the lock, and a preset serial code of the lock.

17. The smart key as in claim 16, wherein:

when the lock information is a picture of the lock, the input terminal is a camera;

when the lock information is a geographic location of the lock, the input terminal is a global positioning system; and when the lock information is a preset serial code, the input terminal is a keypad.

18. The smart key as in claim 13, wherein the input terminal is used to set the predetermined user information and the predetermined lock information.

19. The smart key as in claim 9, wherein the storage unit is built into the smart key.

20. The smart key as in claim 9, wherein the storage unit is an external device coupled to the smart key.

* * * * *